– – –

United States Patent [19]
Richter

[11] 3,790,354
[45] Feb. 5, 1974

[54] WELDING ARRANGEMENT OF EXPLOSIVE-PLATED METAL SHEETS

[75] Inventor: Ulf Richter, Wurgendorf, Germany

[73] Assignee: Dynamit Nobel Ag., Troisdorf, Germany

[22] Filed: Aug. 18, 1971

[21] Appl. No.: 154,637

Related U.S. Application Data

[62] Division of Ser. No. 16,128, March 3, 1970, Pat. No. 3,629,932.

[30] Foreign Application Priority Data
Mar. 3, 1969   Germany............................ 1910674

[52] U.S. Cl.................................. 29/191, 29/191.6
[51] Int. Cl............................................ B32b 15/00
[58] Field of Search.. 29/472.1, 16, 128, 191, 191.6

[56] References Cited
UNITED STATES PATENTS

| | | | |
|---|---|---|---|
| 2,158,799 | 5/1939 | Larson | 29/471.1 UX |
| 3,325,191 | 6/1967 | Yates | 29/472.1 X |
| 3,464,802 | 9/1969 | Meyer | 29/191 X |

FOREIGN PATENTS OR APPLICATIONS 225,502   1/1963   Austria .............................. 29/472.1

*Primary Examiner*—A. B. Curtis
*Attorney, Agent, or Firm*—Craig, Antonelli & Hill

[57] ABSTRACT

The present disclosure relates to a process and arrangement of elements for welding explosive plated metal sheets which substantially eliminate the formation of cracks when the weld is exposed to mechanical stresses.

5 Claims, 2 Drawing Figures

WELDING ARRANGEMENT OF EXPLOSIVE-PLATED METAL SHEETS

This application is a division of Ser. No. 16,128 filed Mar. 30, 1970, now U.S. Pat. No. 3,629,932.

BACKGROUND OF THE INVENTION

The present invention relates to the welding of explosive-clad plated (blast-plated) metal sheets. More particularly the present invention relates to a process and arrangement for welding explosive-clad metal sheets.

As is well known, it is possible, by means of the explosive-cladding process, to permanently join the surface of two metal plates, metals which cannot be bonded in a conventional manner, such as, for example, steel with nobler metals, such as titanium, tantalum, molybdenum, zirconium, aluminum, or also, for example, aluminum with copper.

However, as a practical matter, these metal combinations are very problematical, when used for example in the manufacture of chemical apparatus. Said combinations cannot be welded together with the use of conventional methods because brittle zones of intermetallic alloys are formed due to diffusion during heating. These zones result in the formation of cracks when exposed to minor mechanical stresses resulting in the rupturing of the welding bond.

In order to overcome this deficiency, various suggestions have already been advanced. Thus, it is known, for example, to weld together, after the insertion of nickel or silver strips between the metal sheets to be joined, first the nobler material and then the steel. In connection with titanium-steel combinations, it is also conventional to abrade the steel in a V-shape so that the titanium of one metal sheet can be placed into contact with the titanium of the other metal sheet, to cover the junction by a titanium strip, to join this strip, along its edges, with the surface of the clad titanium by means of fillet welding, and, finally, to fill in the V-shaped gap (seam) by means of further welding seams. Furthermore, a process is also known for the fusion welding of titanium-plated metal sheets wherein, after butt-welding the titanium sheets (coatings), a base (root) layer of a metal, for example vanadium, or of an alloy, which does not form any brittle phases with titanium, is introduced at the boundary surface of the titanium-plated metal sheets.

As was discovered by experimentation, these conventional processes exhibit the disadvantage that a zone is produced in the region of the bond wherein the two welded-together metal sheets are not joined together along a more or less large area.

SUMMARY OF THE INVENTION

An object of the present invention is to avoid to prior art disadvantages and to obtain welding zones which produce a very satisfactory and effective bond throughout.

Another object of the present invention is to provide an improved process and arrangement of elements for welding explosive-clad metal sheets which provides a bond which is free of brittle zones of intermetallic alloys formed during heating, due to diffusion.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the scope and spirit of the invention will become apparent to those skilled in the art from this detailed description.

Pursuant to the present invention, the above-mentioned disadvantages may be eliminated and a much improved process for welding explosive-clad metal sheets may be obtained by removing the substrate material of the metal sheets along the edges thereof which are to be welded together, so that the cladding material projects beyond the substrate material. Then an explosive-clad strip manufactured from the same substrate material and cladding material is fittingly inserted in the gaps formed between the metal sheets. A portion of the cladding material of the strip is overlappingly disposed on the projecting portion of the cladding material of the metal sheets. Then the substrate material of the inserted strip is welded along its edges by means of one base (root) layer with the substrate material of the two metal sheets by means of arc welding or by another suitable welding method. The gap on the side of the substrate material and finally also the gap on the side of the cladding material are filled in with the use of appropriate material using additional layers.

BRIEF DESCRIPTION OF THE DRAWINGS

The present invention will become more fully understood from the detailed description given hereinbelow and the accompanying drawings which are given by way of illustration only and thus are not limitative of the present invention and wherein.

DESCRIPTION OF THE PREFERRED EMBODIMENTS

Figure 1:
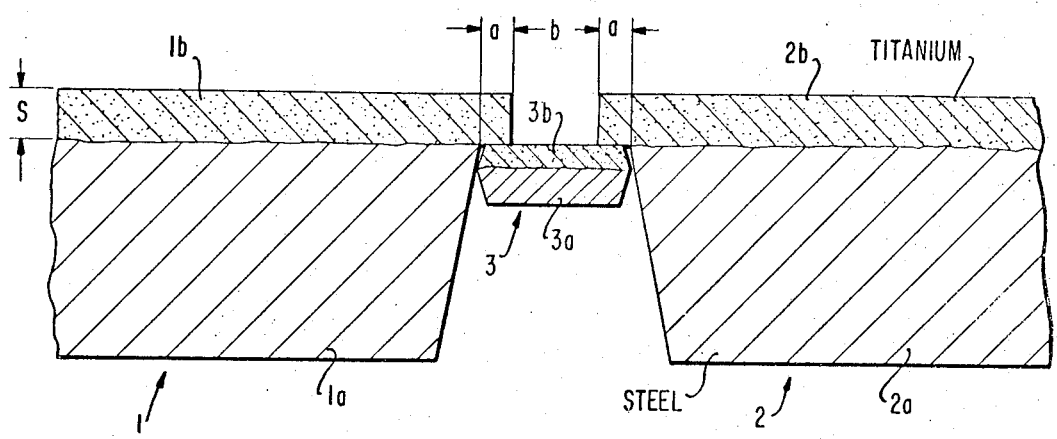
FIG. 1 shows the arrangements of the explosive-clad metal sheets to be welded together, with the explosive-clad strip inserted therebetween.

Referring to FIG. 1, the explosive-clad metal sheet 1, having, for example, steel as the substrate material 1a and, for example, titanium as the plating material 1b, is to be welded together with the metal sheet 2, produced of the same materials. The substrate materials 1a and 2a, respectively, are abraded along the metal sheet areas to be welded together so that the plating material 1b and 2b, respectively, project beyond the substrate material by an amount a. In this connection, this amount is dependent on various factors, particularly on the thicknesses of the metal sheets to be welded together. Between the cladding materials 1b and 2b, the gap b is formed, the size of which is dependent on the plating thickness S.

Between the metal sheets 1 and 2, the explosive-clad strip 3, produced of the same substrate material 3a and cladding material 3b as the metal sheets 1 and 2 to be welded together, is inserted, in such a manner that the cladding material 3b thereof is disposed on the cladding material of the two metal sheets 1 and 2 so that it overlaps therewith. The lateral edges of the cladding material 3b of the strip 3 are shaped in such a manner that they fittingly contact the substrate materials 1a and 2a, respectively, of metal sheets 1 and 2.

The welding process is conducted so that first the substrate material 3a of the insert strip 3 is connected with the substrate materials 1a and 2a, respectively, of the metal sheets 1 and 2, by base (root) layers or root weld 4. These layers are produced with a very thin welding wire (electrode). Thereupon, the gap existing between the substrate materials 1a and 2a is filled in by means of additional welding layers 5 and, finally, the gap on the side of the plating material is then filled in a corresponding fashion with the use of an appropriate material 6.

Figure 2:
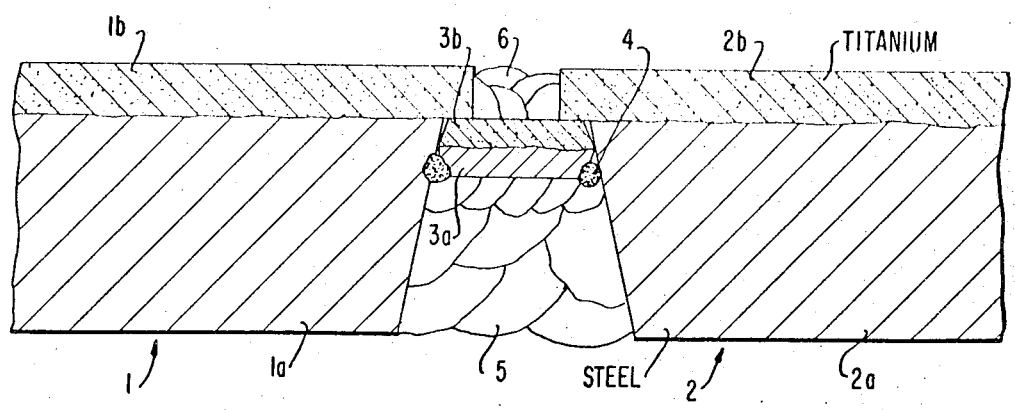
FIG. 2 is a schematic view of the same arrangement after the metal sheets have been welded together.

As can be seen from FIG. 2, the two base root layers 4 (seams) are layed by using thin welding electrodes, (not shown), in order to keep the heat development low. Advantageously, the root layers are made of the same material as the substrate. As can likewise be seen from FIG. 2, however, it is possible to employ larger or thicker electrodes with an increasing number of supports when filling in the gap between the substrate materials 1a and 2a.

For filling the gap on the side of the cladding material, it is recommended to employ the TIG (Tungsten-Inert-Gas) pulsed-arc, argon welding process wherein in addition to maintaining the customary, convention conditions of welding technology required for the production of high-quality welding seams, it is desirable to operate with an inert protective gas, for example, argon (99.99 percent) and to provide, at the same time, an inert gas zone on the side of the substrate material by supplying argon (99.99 percent) thereto, said inert gas zone preventing the access of the air to the melt. In this connection, the argon is fed in the required purity in an appropriate amount so that temperatures of above 650° C. are avoided in the plating material as well as in the substrate material.

The substrate and cladding material can be any metal which form brittle inter-metallic bonds with each other. For example, the substrate can include steel, stainless steel, and copper, although steel and stainless steel are generally preferred. The cladding material can include, for example, the nobler metals, such as titanium, tantalum, molybdenum, zirconium, aluminum, and the like. Possible combinations of substrate and cladding material may be, for example, aluminum-copper and copper-silver.

The invention being thus described, it will be obvious that the same may be varied in many ways. Such variations are not to be regarded as a departure from the spirit and scope of the invention, and all such modifications as would be apparent to one skilled in the art are intended to be included.

What is claimed is:

1. A welded arrangement of elements which comprises first and second explosive-plated metal sheets, both of said sheets containing a plating portion and a substrate portion and having welded edges which together define a gap therebetween, the plating portion of said edges extending beyond the substrate portion of said edges, an explosive-plated strip containing the same plating material and substrate material disposed in said gap in such a manner that the end portions of the plating material of said strip overlap with and are welded to the projecting portions of the plating strip of the metal sheets, and base layer material disposed and welded between the substrate material of the inserted strip and the substrate material of the metal sheets.

2. The arrangement of claim 1, wherein the gap on the side of the substrate material and the gap on the side of the plating material are filled in.

3. The arrangement of claim 1, wherein the explosive plated strip is fittingly inserted in the gap formed between the metal sheets.

4. The arrangement of claim 1, wherein the plating material is selected from the group consisting of titanium, tantalum, molybdenum, zirconium and aluminum.

5. The arrangement of claim 1, wherein the substrate is steel or copper.

* * * * *